(12) United States Patent
Olenoski et al.

(10) Patent No.: US 11,093,637 B2
(45) Date of Patent: *Aug. 17, 2021

(54) IDENTITY BREACH NOTIFICATION AND REMEDIATION

(71) Applicant: Capital One Services, LLC, McLean, VA (US)

(72) Inventors: Michelle Olenoski, Washington, DC (US); Clayton Johnson, Edgewood, MD (US); Jeffrey Brown, Springfield, VA (US); Venkata Ph Kolli, Rockville, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,925

(22) Filed: Apr. 15, 2019

(65) Prior Publication Data

US 2019/0325159 A1   Oct. 24, 2019

Related U.S. Application Data

(63) Continuation of application No. 15/958,572, filed on Apr. 20, 2018, now Pat. No. 10,275,613.

(51) Int. Cl.
   *G06F 21/62* (2013.01)
   *H04W 4/12* (2009.01)
   (Continued)

(52) U.S. Cl.
   CPC ...... *G06F 21/6245* (2013.01); *G06F 21/6236* (2013.01); *H04L 63/0428* (2013.01);
   (Continued)

(58) Field of Classification Search
   CPC ............. G06F 21/6245; G06F 21/6236; G06F 21/6263; H04L 63/20; H04L 63/0428;
   (Continued)

(56) References Cited

U.S. PATENT DOCUMENTS 7,860,755 B2   12/2010   Warner
8,818,882 B2   8/2014    Carlson et al.
(Continued)

OTHER PUBLICATIONS

Bridgei2i, "Risk Scoring," BRIDGEi2i Analytics Solutions, www.bridgei2i.com/risk-scoring.html, Printed Aug. 18, 2014, 3 pages.

*Primary Examiner* — Abu S Sholeman
(74) *Attorney, Agent, or Firm* — DLA Piper LLP (US)

(57) ABSTRACT

In one aspect, the present disclosure relates to a method for improved security in a networked computing environment, the method comprising: receiving, from a user device, a registration request comprising a user identifier for a user; receiving, from the user device, user credentials to access one or more online accounts associated with the user; accessing the one or more online accounts to retrieve user activity data for the user; analyzing the retrieved user activity data to determine one or more merchants associated with the user; storing, in a database coupled to a server device, a mapping between the user and the one or more merchants; receiving, from a monitoring service, an indication that a first merchant of the one or more merchants has experienced a data breach; and sending a notification to the user in response to determining that the first merchant has experienced a data breach.

19 Claims, 5 Drawing Sheets

(51) Int. Cl.
*H04L 29/06* (2006.01)
*H04W 12/12* (2021.01)

(52) U.S. Cl.
CPC ........ *H04L 63/102* (2013.01); *H04L 63/1416* (2013.01); *H04L 63/20* (2013.01); *H04W 4/12* (2013.01); *H04W 12/12* (2013.01)

(58) Field of Classification Search
CPC . H04L 63/1416; H04L 63/102; H04L 9/3213; H04W 12/12; H04W 4/12; G06Q 40/02; G06Q 20/382; G06Q 20/401
USPC .......................................................... 705/51
See application file for complete search history.

(56) References Cited

U.S. PATENT DOCUMENTS

| | | | |
|---|---|---|---|
| 9,077,747 | B1 | 7/2015 | Chen et al. |
| 9,292,701 | B1 | 3/2016 | Chebakov et al. |
| 9,600,845 | B2 | 3/2017 | Nordyke et al. |
| 9,860,234 | B2 | 1/2018 | Sondhi et al. |
| 10,467,559 | B1* | 11/2019 | Svenson ................ G06Q 30/06 |
| 2004/0162781 | A1* | 8/2004 | Searl .................... H04L 63/1408 705/51 |
| 2005/0144122 | A1 | 6/2005 | Creveling et al. |
| 2008/0270209 | A1 | 10/2008 | Mauseth et al. |
| 2009/0119741 | A1 | 5/2009 | Palnitkar et al. |
| 2010/0100930 | A1 | 4/2010 | King |
| 2010/0306821 | A1* | 12/2010 | Cathcart ........... G06Q 10/06375 726/3 |
| 2011/0184838 | A1 | 7/2011 | Winters et al. |
| 2011/0252140 | A1 | 10/2011 | Seif et al. |
| 2012/0209677 | A1* | 8/2012 | Mehta ................ G06Q 20/3224 705/14.16 |
| 2012/0259782 | A1* | 10/2012 | Hammad ............ G06Q 20/382 705/44 |
| 2013/0091001 | A1 | 4/2013 | Jia et al. |
| 2014/0052636 | A1 | 2/2014 | Mattes |
| 2015/0161606 | A1* | 6/2015 | Lee ...................... G06Q 20/384 705/44 |
| 2015/0206107 | A1* | 7/2015 | Chen ...................... G06Q 20/12 705/39 |
| 2015/0348042 | A1* | 12/2015 | Jivraj ................... G06Q 20/322 705/44 |
| 2016/0148332 | A1* | 5/2016 | Stibel ................. G06Q 20/4014 705/44 |
| 2016/0267406 | A1 | 9/2016 | Bodo et al. |
| 2016/0314479 | A1 | 10/2016 | Kulasooriya et al. |
| 2016/0364727 | A1* | 12/2016 | DeLawter .......... G06Q 20/4016 |
| 2017/0024828 | A1* | 1/2017 | Michel .................. G06Q 40/12 |
| 2017/0213052 | A1* | 7/2017 | Michel .................. G06Q 30/06 |
| 2017/0286962 | A1 | 10/2017 | Lai et al. |
| 2017/0302655 | A1 | 10/2017 | Sondhi et al. |
| 2017/0352057 | A1 | 12/2017 | Bhatt et al. |
| 2018/0054442 | A1 | 2/2018 | Dabbiere |
| 2018/0268135 | A1* | 9/2018 | Nachenberg .......... G06F 21/602 |
| 2019/0318126 | A1* | 10/2019 | Mascaro ............. H04L 63/1441 |

\* cited by examiner

IDENTITY BREACH NOTIFICATION AND REMEDIATION

CROSS-REFERENCE TO RELATED APPLICATIONS

This is a continuation of U.S. application Ser. No. 15/958,572, filed Apr. 20, 2018, the content of which is herein incorporated by reference in its entirety.

BACKGROUND

A data breach is the intentional or unintentional release of secure or private/confidential information to an untrusted environment. Incidents of data breach range from coordinated attacks by bad actors associated with organized crime or national governments, to careless disposal of used computer equipment.

Merchants, including e-commerce websites and brick-and-mortar stores, are at risk of data breaches. As a result, consumers that trust merchants with their personal data (e.g., name, address, and credit card number) may be at risk of having their identities stolen.

SUMMARY

According to one aspect, the present disclosure relates to a method for improved security in a networked computing environment, the method comprising: receiving, from a user device, a registration request comprising a user identifier for a user; receiving, from the user device, user credentials to access one or more online accounts associated with the user; accessing the one or more online accounts using the user credentials to retrieve user activity data for the user; analyzing the retrieved user activity data to determine one or more merchants associated with the user; storing, in a database coupled to a server device, a mapping between the user and the one or more merchants; receiving, from a monitoring service, an indication that a first merchant of the one or more merchants has experienced a data breach; and sending a notification to the user in response to determining that the first merchant has experienced a data breach.

In some embodiments, accessing the one or more online accounts to retrieve user activity data comprise at least one of: retrieving transaction history data for a financial account associated with the user; receiving web browser data from the user device; retrieving data from an email account associated with the user; and retrieving data from a social media account associated with the user. In some embodiments, receiving an indication that the first merchant has experienced a data breach comprises retrieving data from an application programming interface (API) of the monitoring service. In some embodiments, sending the notification to the user comprises sending an email to the user. In some embodiments, sending the notification to the user comprises sending a push notification to the user device.

In some embodiments, the method comprises performing one or more remedial actions to protect the user from the merchant data breach. In some embodiments, performing the one or more remedial actions comprises sending a request to the first merchant to delete personal information associated with the user. In some embodiments, performing the one or more remedial actions comprises sending a request to a financial service provider to revoke access to a financial account associated with the user. In some embodiments, performing the one or more remedial actions comprises sending a request to the financial service provider to provision a new card number for the user. In some embodiments, performing the one or more remedial actions comprises sending a request to a financial service provider to turn off the first merchant's access to a financial account associated with the user.

According to another aspect, the present disclosure relates to a system for improved security in a networked computing environment, the system comprising: a processor; a volatile memory; and a non-volatile memory storing computer program code. The computer program code, when executed on the processor, causes the processor to execute a process operable to: receive, from a user device, a registration request comprising a user identifier for a user; receive, from the user device, user credentials to access one or more online accounts associated with the user; access the one or more online accounts using the user credentials to retrieve user activity data for the user; analyze the retrieved user activity data to determine one or more merchants associated with the user; store, in a database coupled to a server device, a mapping between the user and the one or more merchants; receive, from a monitoring service, an indication that a first merchant of the one or more merchants has experienced a data breach; and send a notification to the user in response to determining that the first merchant has experienced a data breach.

In some embodiments, the process is operable to access the one or more online accounts by at least one of at least one of: retrieving transaction history data for a financial account associated with the user; receiving web browser data from the user device; retrieving data from an email account associated with the user; and retrieving data from a social media account associated with the user. In some embodiments, the process is operable to receive the indication that the first merchant has experienced a data breach by retrieving data from an application programming interface (API) of the monitoring service. In some embodiments, the process is operable to send the notification to the user by sending an email to the user. In some embodiments, the process is operable to send the notification to the user by sending a push notification to the user device.

In some embodiments, the process is operable to perform one or more remedial actions to protect the user from the merchant data breach. In some embodiments, the process is operable to perform the one or more remedial actions by sending a request to the first merchant to delete personal information associated with the user. In some embodiments, the process is operable to perform the one or more remedial actions by sending a request to a financial service provider to revoke access to a financial account associated with the user. In some embodiments, the process is operable to perform the one or more remedial actions by sending a request to the financial service provider to provision a new card number for the user.

According to yet another aspect, the present disclosure relates to a method for improved security in a networked computing environment, the method comprising: sending, to a server device, user credentials to access one or more online accounts associated with a user, wherein the server device is configured to: access the one or more online accounts using the user credentials to retrieve user activity data, analyze the retrieved user activity data to determine one or more merchants associated with the user, and store, in a database coupled to the server device, a mapping between the user and the one or more merchants; receiving a breach notification indicating that a first merchant has experienced a data breach, wherein the breach notification is received responsive to the server device receiving, from a monitoring service, an indication that a first merchant of the one or more merchants has experienced a data breach; and presenting the breach notification to the user on a user device.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

In some embodiments, the present disclosure relates to systems and methods for improving security of digital data and identities in networked computer environments. Some aspects of the disclosed embodiments include techniques for identity breach notification and remediation. A user (e.g., a consumer) may register with the system and provide their email address or other identifier that can be used to notify the user of a data breach. The user may choose to share various activity data that the system can use to determine which merchants the user is connected to. For example, the user may grant the system access to email accounts, social media accounts, web browser data, and/or credit card transaction data. In some embodiments, the system may be part of (or connected to) a financial service provider computer system, and the user may be an existing customer of the financial service provider. In this case, the user may not need to register or explicitly grant permission for the system to access certain activity data, such as card transaction data. Using this activity data, the system can generate a mapping (or "map") of the merchants the user is connected to. As used herein, a "merchant" may refer to any business or other concern that collects personal or confidential data from its customers/users. Merchants may include, for example, brick-and-mortar stores, e-commerce websites or applications, and any other websites or services that collect personal data, including social networking platforms, data aggregators etc. The system may use external data breach reporting services to discover when a merchant has experienced a data breach. Using the user-merchant maps, the system may notify those users that may have been affected by the data breach. In some embodiments, the system may take remedial actions to protect users affected by the breach, for example by automatically deactivating the customer's credit card or otherwise revoking access to a financial account associated with the user. Embodiments of the disclosure provide improved security in a networked computing environment by mitigating the risk of data breaches.

Figure 1:
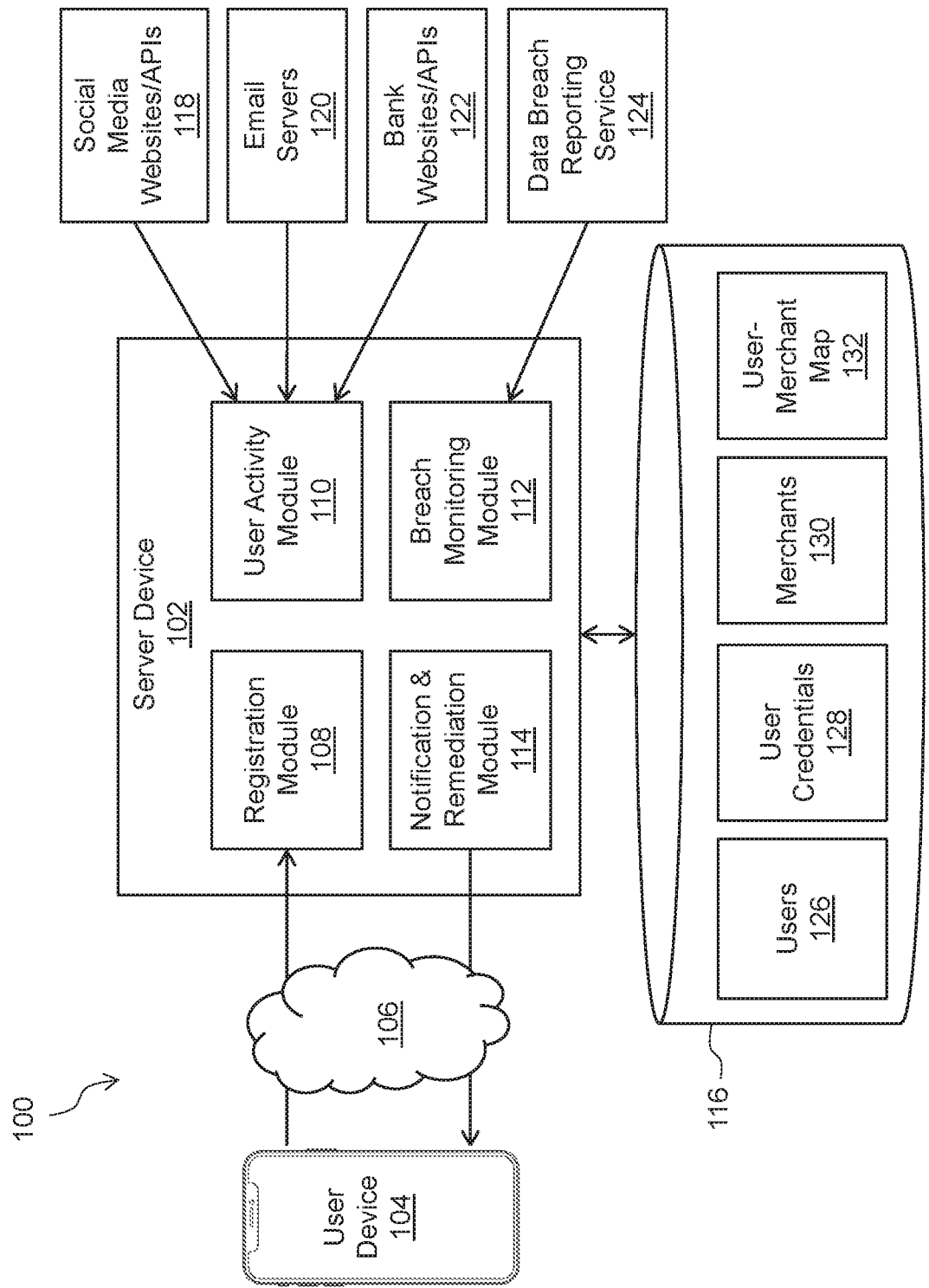
FIG. 1 is a diagram of an illustrative system for identity breach notification and remediation, according to some embodiments of the present disclosure.

FIG. 1 shows a system 100 for identity breach notification and remediation, according to some embodiments of the present disclosure. The illustrative system 100 includes a server device 102 and one or more user devices 104 operatively coupled via a computer network 106. The various components of the system 100 may be connected as shown in FIG. 1 or in any other suitable manner. The system components may be connected by one or more wireless or wired computer networks.

A user device 104 may be a desktop computer, laptop computer, tablet, smartphone, or other type of device configured to run user applications ("apps"). Apps may include web apps and native apps installed on the device 104. In some embodiments, a user device 104 may run an app that communicates with server device 102 to register a user with the system, to grant the system access to the user's activity data, and/or to receive data breach notifications. In some embodiments, a user device app may also perform remedial actions in response to a data breach. The functionality described herein may be included within a standalone app, or as part of an app that performs other functions. For example, the data breach notification and remediation functionality may be implemented within a banking app that allows a user to manage their bank accounts, credit cards, loans, and other financial products.

Server device 102 may include a plurality of software and/or hardware modules, wherein each module is configured to perform certain processing described herein. In the embodiment shown, the server device 102 includes a registration module 108, a user analysis module 110, a breach monitoring module 112, and a notification and remediation module 114. The server device may further include, or be operatively coupled to, a database 116. In some embodiments, one or more of the server modules 108-114 may include an application programming interface (API) via which a user device 104 can issue specific types of requests discussed herein below.

Registration module 108 may be configured to register users with the system 100. In some embodiments, the registration module 108 may be configured to receive registration requests. A registration request may include a user identifier, such as an email address or a username. The user identifier may be stored within the database 116, for example within users table 126. The users table 126 may also store preferences for a user. In some embodiments, preferences may include the user's preferred method for receiving identity breach notifications, such as email notifications, notifications by text message, push notifications, in-app notifications, etc.

A registration request may include credentials that allow the system 100 to access one or more online accounts on the user's behalf. For example, the user may grant access to social media accounts by providing login credentials to a social media websites 118 or to an application programming interfaces (APIs) provided by a social network 118. As another example, the user may grant access to an email account by providing login credentials (e.g., email address and password, access token, etc.) to an email server 120. As yet another example, the user may grant access to transaction data for a credit or debit card ("card") or other type of financial account by providing login credentials to bank website 122. The user credentials may be stored in the database 116, for example within user credentials table 128. In some embodiments, the users table 126 and/or user credentials table 128 may be encrypted.

In some embodiments, registration module 108 may be configured to receive requests to update existing user account information. For example, a user may send an update request to add or remove stored user credentials. As another example, a user may update their user identified (e.g., email address) or preferences stored within the user table 126.

In some embodiments, the system 100 may use a list of merchants to perform data breach notification and remediation. For example, database 116 may store a merchants table 130 having a list merchant names and website uniform resource locators (URLs). In some embodiments, the server device 102 may include an administration module (not shown) via which administrators can send requests to add, update, or remove information in the merchants table 130. In some embodiments, the merchants table 130 may be generated automatically by crowdsourcing activity data obtained for a plurality of users of the system. In some embodiments, the merchants table 130 may include merchant risk assessment information. For example, each merchant may have an associated risk level, which can be set by an administrator or calculated automatically. In some embodiments, the system may use machine learning to assess a merchant's risk classification (e.g., high risk versus low risk). A machine learning model may be based on several variables, such as date/time of the assessment, the merchant's physical address or website geolocation address, and information about past breaches for the merchant. In some embodiments, merchant risk classification may be based on bank data for the merchant, for example fraudulent transaction rate and/or card-not-present transaction rate. In some embodiments, information about the type of personal data a merchant collects may be used to assess the merchant's risk level.

User activity module 110 may be configured to analyze user activity data and generate user-merchant maps 132. Whereas the merchants table 130 may store merchant information that is shared among all users (or many users) of the system 100, a user-merchant map 132 may store merchant information for an individual user. User activity data may include, for example, social media activity by the user, emails sent or received by the user, and financial account transaction data. The user activity module 110 may access and retrieve user activity data from one or more online accounts using stored user credentials 128. The user activity module 110 may analyze a user's activity data when the user first registers and at various times thereafter. For example, module 110 may analyze a user's activity data in response to the user adding or updating user credentials. As another example, module 110 may analyze a user's activity data periodically (e.g., hourly, daily, or weekly).

The user activity module 110 may analyze user activity data to identify merchants the user may have shared data with. For example, the user activity module 110 may search the social media data, emails, web browser data, financial transactions, etc. for merchant names and website URLs that are configured in the merchant's table 130. As another example, the module 110 may search for user sensitive data (e.g., credit card numbers) within the user activity and identify what merchants that may be storing that data. The user activity module 110 may update the user-merchant map 132 based on merchants identified in the user's activity data. In some embodiments, the user-merchant map 132 tracks what type of information a merchant may be storing for a particular user. For example, the map 132 may indicate if a merchant is storing credit card information for a user or if the merchant is only storing the user's first and last name. In some embodiments, the user-merchant map 132 tracks which credit/debit numbers a merchant may be storing for a user. In some embodiments, a merchant's risk level is used to determine what information is stored in the user-merchant map 132.

In some embodiments, user activity module 110 may be configured to analyze a user's social media account to identify merchants the user may have shared personal data with. For example, the module 110 may utilize an API 118 provided by a social network to retrieve the user's social graph (e.g., a list of people and businesses the user is connected to) along with the user's social media activity (e.g., posts, comments, shares, likes, etc.). If a particular social network does not provide an API to retrieve this data, the module 110 may alternatively retrieve the data from the social media's website 118 using "screen scraping" techniques known in the art. After retrieving the social media data, the user activity module 110 may analyze the data to identify merchants the user may have shared personal data with. For example, the user activity module 110 may identify merchants that the user has connected to, has liked, or has posted about.

In some embodiments, user activity module 110 may be configured to analyze emails sent or received by a user to identify merchants that the user may have shared personal data with. For example, the module 110 may connect to an email server 120 and issue one or more requests to find and retrieve relevant email data (e.g., email header and/or body data). In some embodiments, the email server 120 may include an Internet Message Access Protocol (IMAP) server and the user activity module 110 may issue IMAP commands to find and retrieve email data.

In some embodiments, user activity module 110 may be configured to analyze bank transactions to identify merchants the user shared their financial information with. For example, the module 110 may retrieve transaction history from a bank website 122 using "screen scraping" techniques. Alternatively, the user activity module 122 may use an API 122 provided by a bank to retrieve customer transaction data. The API 122 may be a public API or a private/internal API used by the bank. In some embodiments, the user activity module may be associated with a financial institution, and may be configured to access transaction data across one or more products associated with the financial institution.

In some embodiments, user activity module 110 may be configured to analyze web browser data to identify merchants or other platforms the user may have shared data with. Web browser data may include a list of websites visited by the user, a list of websites for which the web browser has stored credentials for the user, and/or a list of bookmarks the user created. In some embodiments, the web browser data may be received from the user device 104. For example, an app running on the user device 104 may access web browser data stored on the device 104 and send the data to the service device 102. In some embodiments, the web browser data may be obtained using a browser plugin/extension installed on the user device 104. In some embodiments, the server device 102 stores the web browser data in memory or on disk (e.g., in database 116) where it can be analyzed by the user activity module 110. In some embodiments, user device 104 may send the user's browser data to the server device 102 periodically (e.g., daily or weekly). In some embodiments, an app running on the user device 104 may be configured to locally analyze browser data to identify merchant websites that the user has visited or bookmarked, and to send information about those merchants to the server device 102 (e.g., to registration module 108) for updating the user-merchant map 132.

Breach monitoring module 112 may be configured to monitor one or more external data breach reporting services 124 to detect that a merchant data breach occurred. In some embodiments, a data breach reporting service 124 may be used to determine if particular user's information was affected by to data breach. The breach monitoring module 112 may use an API provided by an external data breach reporting service 124 or may perform screen scraping. In some embodiments, breach monitoring module 112 may periodically connect to an external service 124 to retrieve breach information. In some embodiments, breach monitoring module 112 may compare breach information provided by an external service 124 to the list of merchants in the merchants table 130. For example, the module 112 may compare information retrieved from breach reporting services 124 to the list of merchant names and website URLs configured in the merchant's table 130. When the breach monitoring module 112 detects a merchant breach, it may send a message or otherwise report this event to the notification and remediation module 114.

The notification and remediation module 114 may be configured to notify users of merchant data breaches. For example, when a data breach is detected by the breach monitoring module 112, the notification and remediation module 114 may use the user-merchant map 132 to determine which users may be affected by the breach, and then take one or more actions to notify those users and/or remediate the breach. In some embodiments, the system may maintain a lookup table that can be used to efficiently identify all users that may be affected by a merchant data breach (e.g., all users that shared some personal information with a particular merchant). In some embodiments, the module 114 sends emails to the affected users using email addresses registered in the users table 126. Other methods of notification include text messages, push notifications, and in-app notifications. In some embodiments, the module 114 queries the users table 126 to determine a user's preferred method of breach notification.

In addition to notifying users of the merchant data breach, module 114 may also take one or more remedial actions to protect the users from identity theft. In some embodiments, the breach notification may include a link that, when clicked, automatically generates an email to the merchant requesting that the user's personal data be deleted from the merchant's website. In some embodiments, the breach notification may include a link to delete or modify the user's payment information on the merchant's website. In some embodiments, the module 114 may send a request to a bank 122 (e.g., using an internal API) to deactivate the user's card, to turn off the breached merchant's access to the card, or to otherwise limit access to a financial account associated with the user, or to place additional flags on an account for increased monitoring or enhanced fraud protection, enhanced credit monitoring services, etc. In some embodiments, the module 114 may send a request to the bank 122 to automatically issue a replacement card for the user or to issue a new virtual/tokenized card number for the user. In some embodiments, module 114 may be associated with a financial institution and may automatically perform one or more of the example remediation techniques across a number of products associated with the financial institution.

In some embodiments, a user's risk exposure may be considered when determining what remedial actions (if any) should be taken in response to detecting a merchant data breach. A user's risk exposure may be determined based on the type of information that the merchant is known to be storing for the user. For example, the system may take a first remedial action for users that shared credit card information with the merchant, and take a second remedial for users that shared only their first and last name with the merchant. In some embodiments, the system 100 may send a notification to users even if they appear to be unaffected by the data breach (e.g., as a precautionary measure).

In some embodiments, the notification method and/or remediation action may be determined based on a risk level (e.g., degree of exposure) associated with the merchant and/or the nature of the breach. For example, for high risk merchants, a user may be sent an email and text message, and the user's card may be automatically deactivated. For a low risk merchant, the system may send only an email, for example.

In some embodiments, the system 100 may notify a user when the user is in the vicinity of a store or other location that was recently involved in a data breach. For example, the user device 104 may include a Global Positioning System (GPS) receiver or other location sensor to determine the user's location. The device 104 may periodically send the user's location to the server device 102, which can be configured to determine if a breach has occurred near that location and, in response, send a push or in-app notification to the user device 104.

In some embodiments, the system 100 may proactively protect users against data breaches. For example, the system 100 may provide a user interface (UI) via which a user can access information stored in the user-merchant map, e.g., the list of merchants to which the user is connected, the user's risk exposure associated with each merchant, and/or the activity that led to the placement of the merchant on the user's individualized user-merchant map. A user's user-merchant map may be displayable to highlight or rank merchants that pose a greatest risk, or where a user has greater exposure etc. As another example, the system 100 may perform one or more remedial actions even in the absence of a breach. In some embodiments, the system 100 may send recommendations to users that are connected to high risk merchants, as denoted by the user-merchant map 132. For example, the system may recommend that such users install/activate a web browser extension that facilitates the use of tokenized card numbers when making online purchases. As another example, the system may recommend that the user install an app for monitoring the credit history/score. In some embodiments, a user interface may be configured to enable a user to select a remedial action (as described herein) with respect to one or more merchants displayed in the user's individualized user-merchant map.

Figure 2:
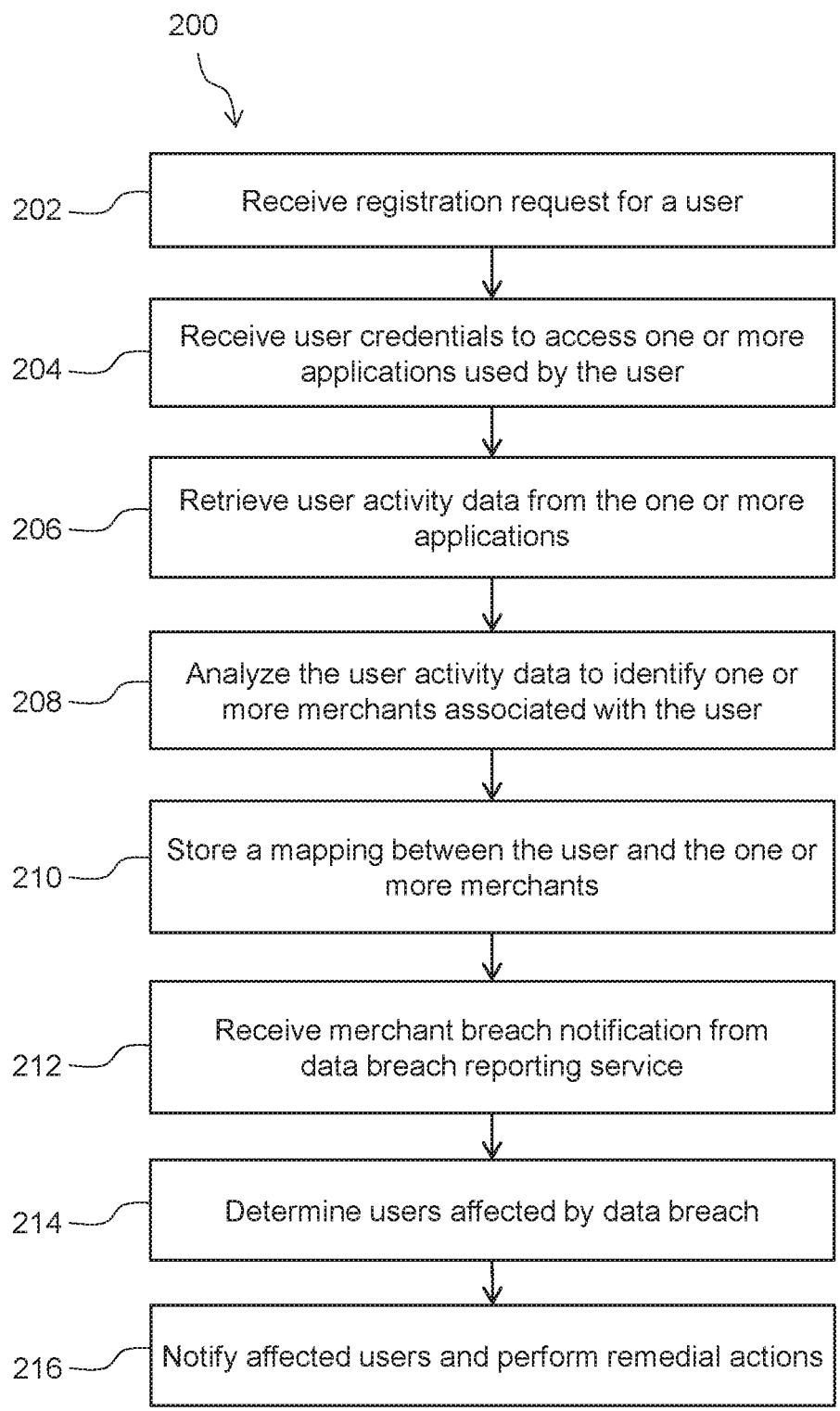
FIGS. 2 and 3 are flow diagrams showing processing that may occur within the system of FIG. 1, according to some embodiments of the present disclosure.

Referring to FIG. 2, a method 200 may provide identity breach notification and remediation, account to some embodiments of the present disclosure. The method 200 may be implemented within a server device, such as server device 102 of FIG. 1.

At block 202, a registration request may be received for a user. The request may include an email address or other user identifier. In some embodiments, the method may be used within a system that is part of (or connected to) a financial service provider computer system and the user may be an existing customer of the financial service provider. In this case, the user may not need to register or explicitly grant permission for the system to access certain activity data, such as card transaction data. At block 204, user credentials may be received for the user. The user credentials can be used to access one or more online accounts associated with the user. For example, the user credentials may include a username and password for a social media network, or an email address and access token for an email service. In some embodiments, the user credentials may be received as part of the registration request.

At block 206, the user credentials may be used to retrieve user activity data from the online accounts. At block 208, the user activity data may be analyzed to identify one or more merchants associated with the user (e.g., one or more merchants with which the user may have shared personal data). For example, this analysis may include identifying merchants the user connected with on social media or merchants the user received emails from. At block 210, a user-merchant map may be generated and stored for the user based on the user activity analysis. The processing of blocks 208 and 210 may include techniques described above in conjunction with the user activity module 110 of FIG. 1.

At block 212, a notification of a merchant breach may be received from an external data breach reporting service (e.g., service 124 in FIG. 1). The processing of block 212 may include techniques described above in conjunction with the breach monitoring module 112 of FIG. 1. At block 214, stored user-merchant maps may be used to determine users affected by the merchant breach. At block 216, notifications may be sent to the affected users and, in some embodiments, remedial actions may be taken to protect the user's personal data. The processing of blocks 214 and 216 may include techniques described above in conjunction with the notification and remediation module 114 of FIG. 1.

Figure 3:
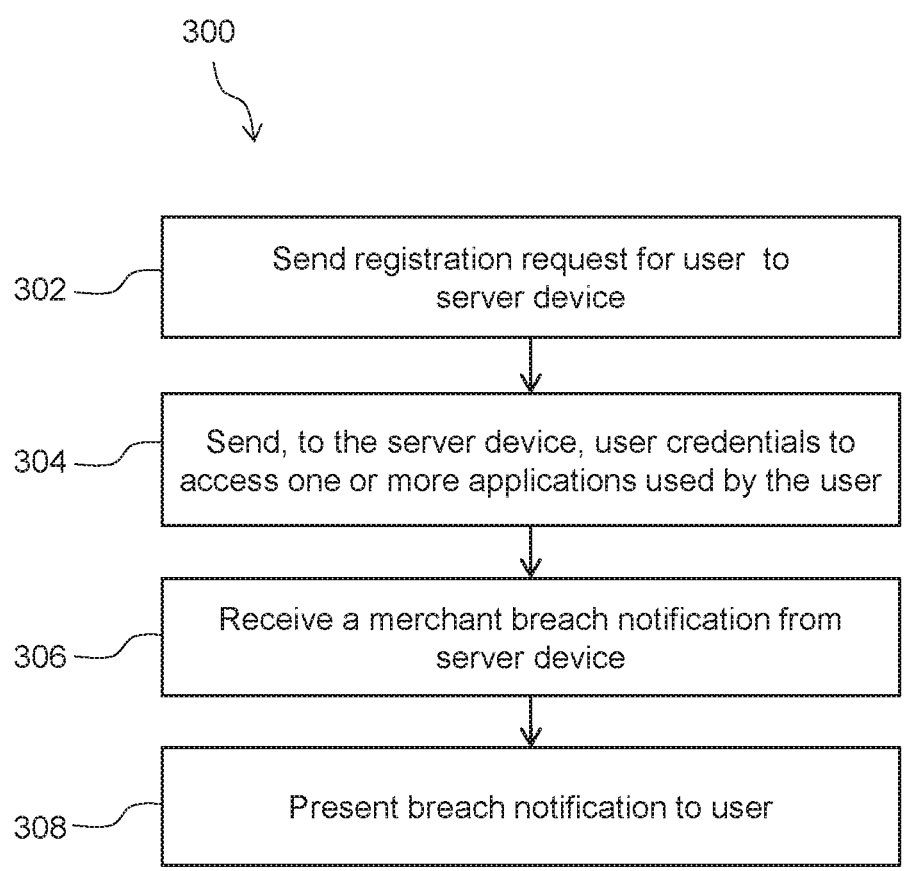

Referring to FIG. 3, a method 300 may provide identity breach notification and remediation, account to some embodiments of the present disclosure. The method 300 may be implemented within a user device, such as user device 104 of FIG. 1.

At block 302, a registration request may be sent to a server device. The request may include an email address or other user identifier. In some embodiments, the method 300 may be used within a system that is part of (or connected to) a financial service provider computer system and the user may be an existing customer of the financial service provider. In this case, the user may not need to register or explicitly grant permission for the system to access certain activity data, such as card transaction data.

At block 304, user credentials may be sent to the server device, the user credentials allowing access to one or more online accounts associated with the user. The user credentials can be used to access one or more online accounts associated with the user. For example, the user credentials may include a username and password for a social media network, or an email address and access token for an email service. In some embodiments, the user credentials may be received as part of the registration request.

At block 306, a merchant breach notification may be received from the server device. In some embodiments, the server device may receive a notification of a merchant breach from an external data breach reporting service and/or using techniques described above in conjunction with the breach monitoring module 112 of FIG. 1. At block 308, the breach notification may be presented to the user. In some embodiments, one or more remedial actions may be taken, such as a remedial action described above in conjunction with the notification and remediation module 114 of FIG. 1.

Figure 4:
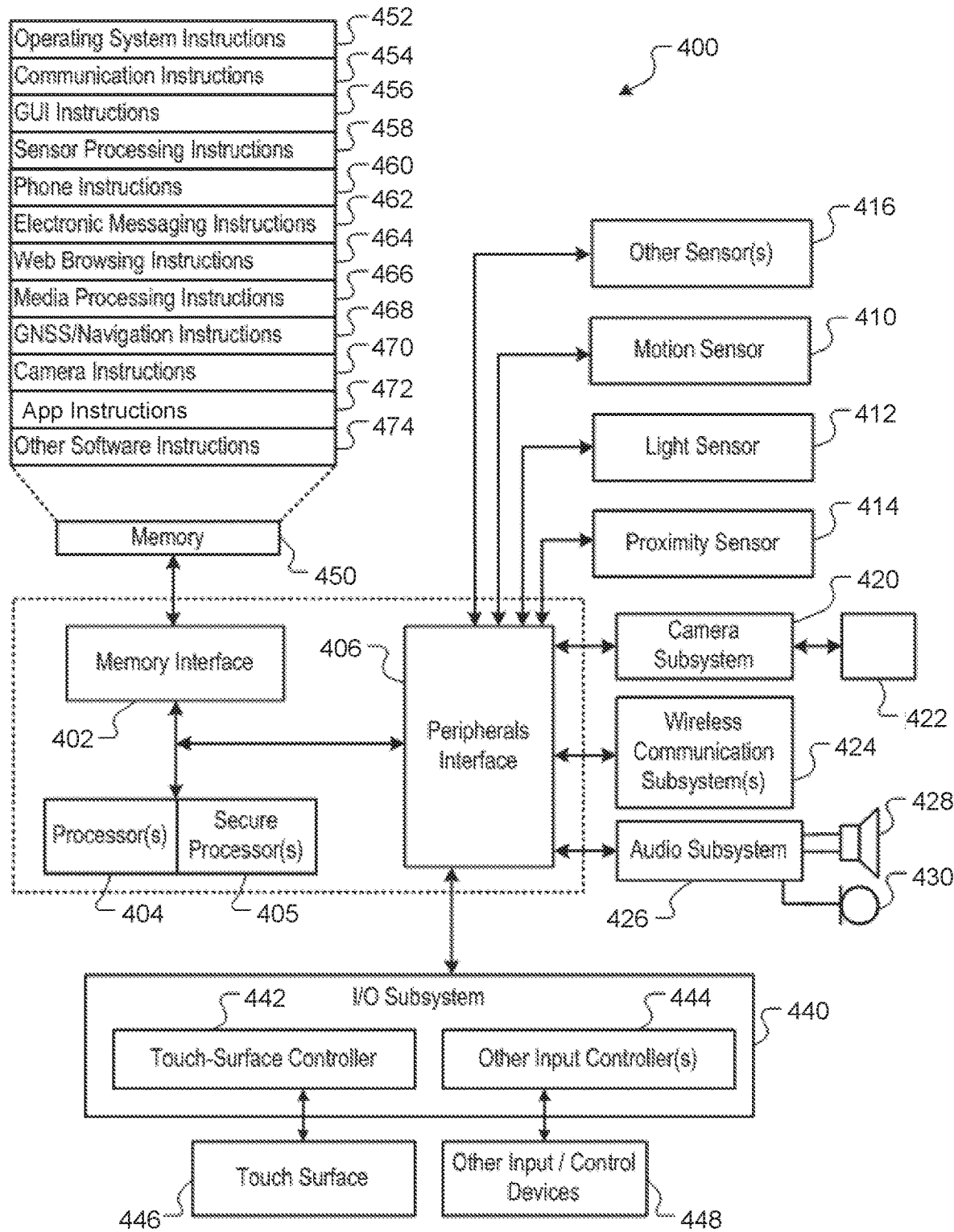
FIG. 4 is a diagram of an illustrative user device, according to some embodiments of the present disclosure.

FIG. 4 shows an illustrative user device 400, according to an embodiment of the present disclosure. The illustrative user device 400 may include a memory interface 402, one or more data processors, image processors, central processing units 404, and/or secure processing units 405, and a peripherals interface 406. The memory interface 402, the one or more processors 404 and/or secure processors 405, and/or the peripherals interface 406 may be separate components or may be integrated in one or more integrated circuits. The various components in the user device 400 may be coupled by one or more communication buses or signal lines.

Sensors, devices, and subsystems may be coupled to the peripherals interface 406 to facilitate multiple functionalities. For example, a motion sensor 410, a light sensor 412, and a proximity sensor 414 may be coupled to the peripherals interface 406 to facilitate orientation, lighting, and proximity functions. Other sensors 416 may also be connected to the peripherals interface 406, such as a global navigation satellite system (GNSS) (e.g., GPS receiver), a temperature sensor, a biometric sensor, magnetometer, or other sensing device, to facilitate related functionalities.

A camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. The camera subsystem 420 and the optical sensor 422 may be used to collect images of a user to be used during authentication of a user, e.g., by performing facial recognition analysis.

Communication functions may be facilitated through one or more wired and/or wireless communication subsystems 424, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 424. The specific design and implementation of the communication subsystems 424 may depend on the communication network (s) over which the user device 400 is intended to operate. For example, the user device 400 may include communication subsystems 424 designed to operate over a GSM network, a GPRS network, an EDGE network, a WiFi or WiMax network, and a Bluetooth™ network. For example, the wireless communication subsystems 424 may include hosting protocols such that the device 400 can be configured as a base station for other wireless devices and/or to provide a WiFi service.

An audio subsystem 426 may be coupled to a speaker 428 and a microphone 430 to facilitate voice-enabled functions, such as speaker recognition, voice replication, digital recording, and telephony functions. The audio subsystem 426 may be configured to facilitate processing voice commands, voiceprinting, and voice authentication, for example.

The I/O subsystem 440 may include a touch-surface controller 442 and/or other input controller(s) 444. The touch-surface controller 442 may be coupled to a touch surface 446. The touch surface 446 and touch-surface controller 442 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 446.

The other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of the speaker 428 and/or the microphone 430.

In some implementations, a pressing of the button for a first duration may disengage a lock of the touch surface 446; and a pressing of the button for a second duration that is longer than the first duration may turn power to the user device 400 on or off. Pressing the button for a third duration may activate a voice control, or voice command, module that enables the user to speak commands into the microphone 430 to cause the device to execute the spoken command. The user may customize a functionality of one or more of the buttons. The touch surface 446 can, for example, also be used to implement virtual or soft buttons and/or a keyboard.

In some implementations, the user device 400 may present recorded audio and/or video files, such as MP3, AAC, and MPEG files. In some implementations, the user device 400 may include the functionality of an MP3 player, such as an iPod™. The user device 400 may, therefore, include a 36-pin connector and/or 8-pin connector that is compatible with the iPod. Other input/output and control devices may also be used.

The memory interface 402 may be coupled to memory 450. The memory 450 may include high-speed random access memory and/or non-volatile memory, such as one or more magnetic disk storage devices, one or more optical storage devices, and/or flash memory (e.g., NAND, NOR). The memory 450 may store an operating system 452, such as Darwin, RTXC, LINUX, UNIX, OS X, WINDOWS, or an embedded operating system such as VxWorks.

The operating system 452 may include instructions for handling basic system services and for performing hardware dependent tasks. In some implementations, the operating system 452 may be a kernel (e.g., UNIX kernel). In some implementations, the operating system 452 may include instructions for performing voice authentication.

The memory 450 may also store communication instructions 454 to facilitate communicating with one or more additional devices, one or more computers and/or one or more servers. The memory 450 may include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GNSS/Navigation instructions 468 to facilitate GNSS and navigation-related processes and instructions; and/or camera instructions 470 to facilitate camera-related processes and functions.

The memory 450 may store instructions 472 for an identity breach notification/remediation app. The app instructions 472 may include, for example, instructions to implement method 300 of FIG. 3. The memory 450 may also store other software instructions 474, such as instructions for other apps installed on the device 400.

Each of the above identified instructions and applications may correspond to a set of instructions for performing one or more functions described herein. These instructions need not be implemented as separate software programs, procedures, or modules. The memory 450 may include additional instructions or fewer instructions. Furthermore, various functions of the user device 400 may be implemented in hardware and/or in software, including in one or more signal processing and/or application specific integrated circuits.

In some embodiments, processor 404 may perform processing including executing instructions stored in memory 450, and secure processor 405 may perform some processing in a secure environment that may be inaccessible to other components of user device 400. For example, secure processor 405 may include cryptographic algorithms on board, hardware encryption, and physical tamper proofing. Secure processor 405 may be manufactured in secure facilities. Secure processor 405 may encrypt data/challenges from external devices. Secure processor 405 may encrypt entire data packages that may be sent from user device 400 to the network. Secure processor 405 may separate a valid user/external device from a spoofed one, since a hacked or spoofed device may not have the private keys necessary to encrypt/decrypt, hash, or digitally sign data, as described herein.

Figure 5:
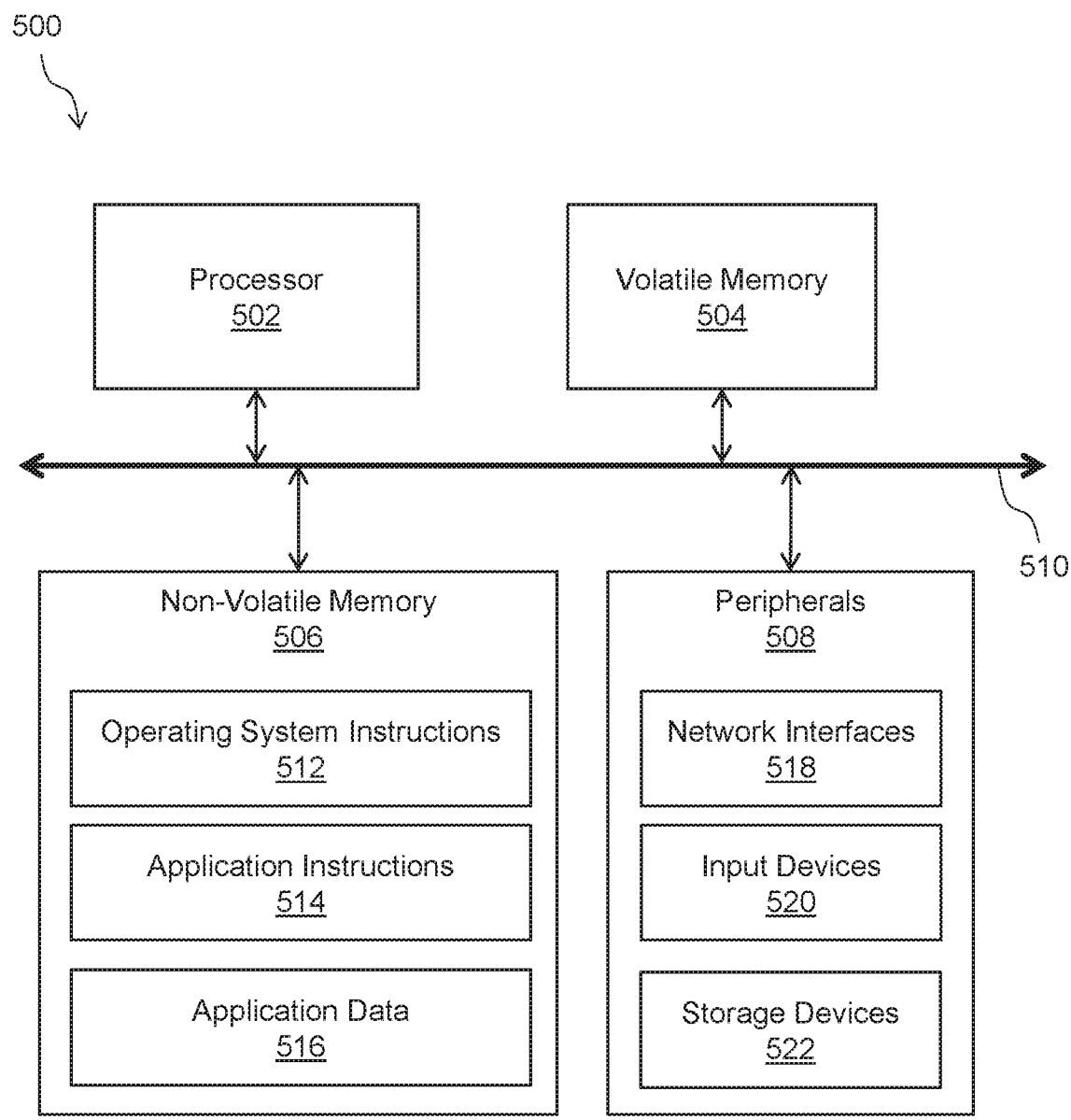
FIG. 5 is a diagram of an illustrative server device, according to some embodiments of the present disclosure.

FIG. 5 shows an illustrative server device 500 that may implement various features and processes as described herein. The server device 500 may be implemented on any electronic device that runs software applications derived from compiled instructions, including without limitation personal computers, servers, smart phones, media players, electronic tablets, game consoles, email devices, etc. In some implementations, the server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512 and application instructions 514. Operating system instructions 512 may include instructions for implementing an operating system (e.g., Mac OS®, Windows®, or Linux). The operating system may be multi-user, multiprocessing, multitasking, multithreading, real-time, and the like. The operating system instructions 512 may include network communications instructions, for example, software for implementing communication protocols, such as TCP/IP, HTTP, Ethernet, telephony, etc. Application instructions 514 can include instructions for identity breach notification and remediation as described herein. For example, application instructions 514 may include instructions for modules 108-114 described above in conjunction with FIG. 1. Application data 516 may correspond to data stored by the applications running on the server device 500. For example, application data may 516 may include user-merchant maps used for identity breach notification and remediation.

Peripherals 508 may be included within the server device 500 or operatively coupled to communicate with the sever device 500. Peripherals 508 may include, for example, network interfaces 518, input devices 520, and storage devices 522. Network interfaces may include for example an Ethernet or WiFi adapter. Input devices 520 may be any known input device technology, including but not limited to a keyboard (including a virtual keyboard), mouse, track ball, and touch-sensitive pad or display. Storage devices 522 may include one or more mass storage devices for storing data files; such devices include magnetic disks, such as internal hard disks and removable disks; magneto-optical disks; and optical disks.

Methods described herein may represent processing that occurs within a system for identity breach notification and remediation (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for improved security in a networked computing environment, the method comprising:
   receiving, by a computing system, permission from a user device of a user to access activity data associated with one or more user accounts, the activity data stored remotely from the computing system;
   accessing, by the computing system via an application programming interface (API), the activity data associated with the one or more user accounts, the activity data comprising at least transaction history data for a credit or debit card issued by a financial institution and online activity data from social media web sites;
   parsing, by the computing system, the activity data to identify one or more merchants with which the user has interacted;
   determining, by the computing system, that a first merchant of the one or more merchants has experienced a data breach; and
   performing, by the computing system, one or more remedial actions to protect the user from the data breach.

2. The method of claim 1 comprising, in response to determining that the first merchant has experienced the data breach:
   determining a user's preferred method for receiving identity breach notifications; and
   sending a notification to the user in accordance with the user's preferred method for receiving identity breach notification.

3. The method of claim 2 wherein sending the notification to the user comprises sending a push notification to a banking app installed on the user device.

4. The method of claim 1 wherein the activity data comprises web browser data received from the user device.

5. The method of claim 1 comprising:
   generating a list of merchants by crowdsourcing activity data for a plurality of users, the list of merchants including the first merchant; and
   calculating a risk level for each merchant in the list of merchants, wherein performing the one or more remedial actions to protect the user from the data breach is based on the risk level calculated for the first merchant.

6. The method of claim 5 wherein calculating the risk level for each merchant in the list of merchants comprises using a machine learning model based at least on information about past breaches for the merchant.

7. The method of claim 5 wherein calculating the risk level for each merchant in the list of merchants is based on a fraudulent transaction rate or card-not-present transaction rate associated with the merchant.

8. The method of claim 5 wherein calculating the risk level for each merchant in the list of merchants is based on a type of personal data the merchant collects.

9. The method of claim21 wherein the one or more remedial actions comprise at least one of:
sending a request to the first merchant to delete personal information associated with the user,
sending a request to a financial service provider to revoke access to a financial account associated with the user, and
sending a request to a financial service provider to provision a new card number for the user.

10. A non-transitory computer-readable medium storing program instructions that are executable to:
receive, by a computing system, permission from a user device of a user to access activity data associated with one or more user accounts, the activity data stored remotely from the computing system;
access, by the computing system via an application programming interface (API), the activity data associated with the one or more user accounts, the activity data comprising at least transaction history data for a credit or debit card account issued by a financial institution and online activity data from social media websites;
parse, by the computing system, the activity data to identify one or more merchants with which the user has interacted;
determine, by the computing system, that a first merchant of the one or more merchants has experienced a data breach; and
perform, by the computing system, one or more remedial actions to protect the user from the data breach.

11. The non-transitory computer-readable medium of claim 10 storing program instructions that are executable to, in response to determining that the first merchant has experienced a data breach:
determine a user's preferred method for receiving identity breach notifications; and
send a notification to the user in accordance with the user's preferred method for receiving identity breach notification.

12. The non-transitory computer-readable medium of claim 11 wherein sending the notification to the user comprises sending a push notification to a banking app installed on the user device.

13. The non-transitory computer-readable medium of claim 10 wherein the activity data comprises web browser data received from the user device.

14. The non-transitory computer-readable medium of claim 10 storing program instructions that are executable to:
generate a list of merchants by crowdsourcing activity data for a plurality of users, the list of merchants including the first merchant; and
calculate a risk level for each merchant in the list of merchants,
wherein performing the one or more remedial actions to protect the user from the data breach is based on the risk level calculated for the first merchant.

15. The non-transitory computer-readable medium of claim 14 wherein calculating the risk level for each merchant in the list of merchants comprises using a machine learning model trained using information about past breaches for the merchant.

16. The non-transitory computer-readable medium of claim 14 wherein calculating the risk level for each merchant in the list of merchants is based on a fraudulent transaction rate or card-not-present transaction rate for the merchant.

17. The non-transitory computer-readable medium of claim 14 wherein calculating the risk level for each merchant in the list of merchants is based on a type of personal data the merchant collects.

18. The non-transitory computer-readable medium of claim 10 wherein the one or more remedial actions comprise at least one of:
sending a request to the first merchant to delete personal information associated with the user,
sending a request to a financial service provider to revoke access to a financial account associated with the user, and
sending a request to a financial service provider to provision a new card number for the user.

19. A system for improved security in a networked computing environment, the system comprising:
a processor; and
a non-volatile memory storing computer program code that when executed on the processor causes the processor to execute a process operable to:
receive permission from a user device of a user to access activity data associated with one or more user accounts, the activity data stored remotely from the system;
access, via an application programming interface (API), the activity data associated with the one or more user accounts, the activity data comprising at least transaction history data for a credit or debit card account issued by a financial institution and online activity data from social media websites;
parse the activity data to identify one or more merchants with which the user has transacted interacted;
determine that a first merchant of the one or more merchants has experienced a data breach; and
perform one or more remedial actions to protect the user from the data breach.

* * * * *